United States Patent
Schuler

(10) Patent No.: US 6,303,243 B1
(45) Date of Patent: Oct. 16, 2001

(54) PLANT WITH HIGH TEMPERATURE FUEL CELLS II

(75) Inventor: Alexander Schuler, Weisslingen (CH)

(73) Assignee: Sulzer Hexis AG, Winterthur (CH)

( * ) Notice: Subject to any disclaimer, the term of this patent is extended or adjusted under 35 U.S.C. 154(b) by 0 days.

(21) Appl. No.: 09/361,668

(22) Filed: Jul. 27, 1999

(30) Foreign Application Priority Data

Jul. 31, 1998 (EP) .................................................. 98810740

(51) Int. Cl.$^7$ ............................................................ H01M 8/06
(52) U.S. Cl. .................................................... 429/17; 20/26
(58) Field of Search .................... 429/12, 13, 17, 429/19, 20, 26, 30, 31, 32

(56) References Cited

U.S. PATENT DOCUMENTS

| | | |
|---|---|---|
| 3,718,506 | 2/1973 | Fischer . |
| 4,128,700 | 12/1978 | Sederquist . |
| 5,079,105 * | 1/1992 | Bossel . |
| 6,042,956 * | 3/2000 | Lenel . |

FOREIGN PATENT DOCUMENTS

| | | |
|---|---|---|
| 0266861A1 | 5/1988 | (EP) . |
| 0654838A1 | 5/1995 | (EP) . |
| 0780917A1 | 6/1997 | (EP) . |

* cited by examiner

Primary Examiner—Stephen Kalafut
Assistant Examiner—Susy Tsang
(74) Attorney, Agent, or Firm—Townsend and Townsend and Crew LLP

(57) ABSTRACT

The plant (1) contains high temperature fuel cells (20) which are arranged with planar design in a centrally symmetrical stack (2). A supply point (5) is provided for a gaseous or liquid fuel (50). In a reformer (4) following the supply point the fuel can be catalytically converted at least partially into CO and $H_2$ in the presence of $H_2O$ and with process heat being supplied. An afterburner chamber (6) follows the output points of the fuel cells (20). A feedback connection (61) exists between the supply point and the afterburner chamber via which the exhaust gas (60', 70') can be fed back to the supply point. In case no gas is provided as a fuel, the supply point comprises a means for feeding in a liquid fuel, such as using an atomizer.

9 Claims, 3 Drawing Sheets

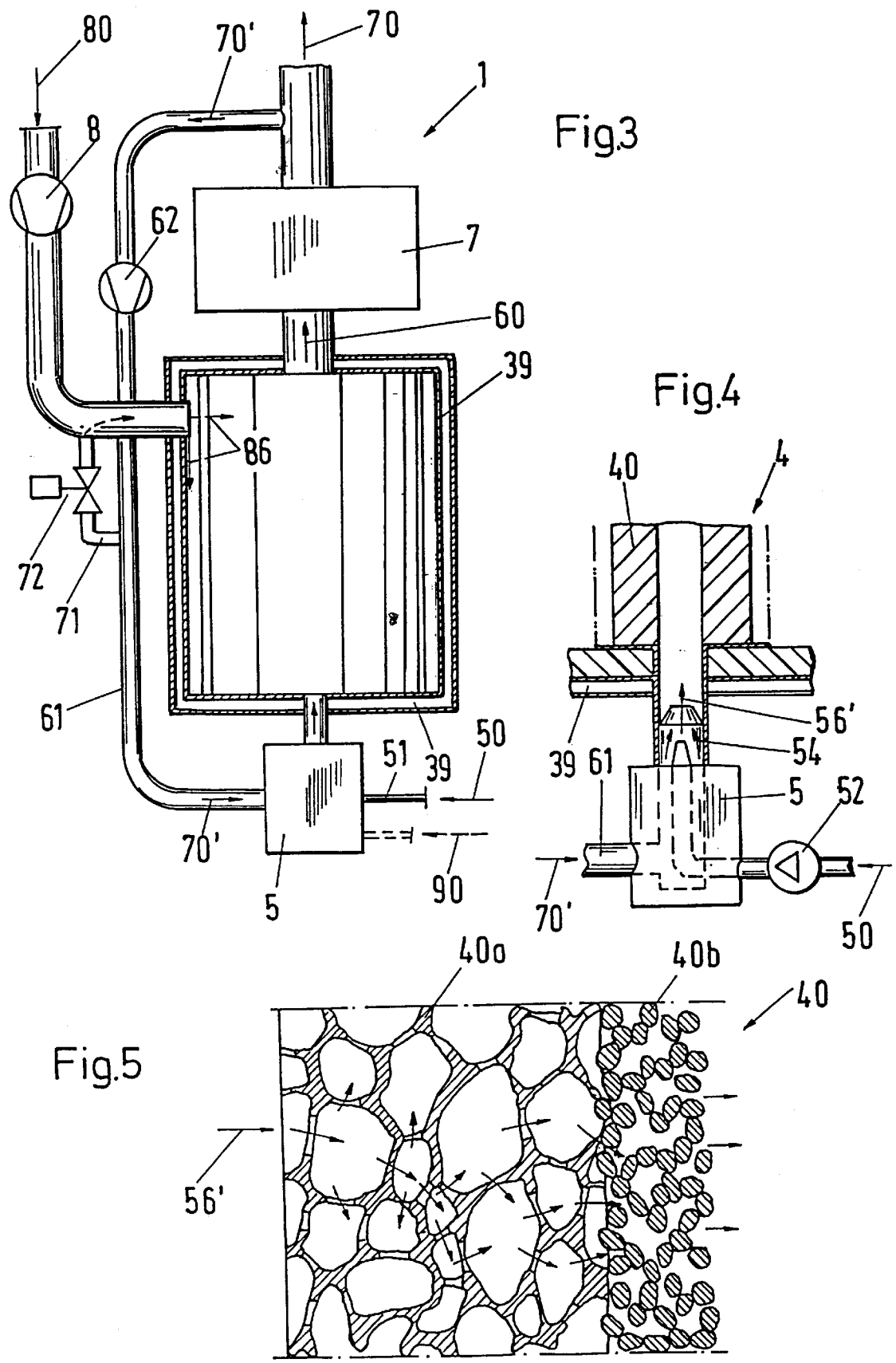

| n = | $H_2O$ | $CO_2$ | $O_2$ |
|---|---|---|---|
| 1 | 206 | 246 | -36 |
| 4 | 650 | 810 | -318 |
| 16 | 2469 | 3109 | -515 |
| 20 | 3076 | 3876 | -654 |

Fig.6

PLANT WITH HIGH TEMPERATURE FUEL CELLS II

The invention relates to a plant with high temperature fuel cells and to a method for the operation of the plant.

BACKGROUND OF THE INVENTION

A plant of this kind comprises an apparatus such as is known from EP-A 0 780 917 (=P.6719). This apparatus contains a cell block with fuel cells which is surrounded by a heat insulating sleeve. An afterburner chamber is located between the sleeve and the cell block. A reformer for the treatment of a fuel gas (also called a pre-reformer) is arranged in the sleeve. It is connected to a heat exchanger. Heat for the endothermic reforming process can be supplied to it from the exhaust gases.

In the reforming of the fuel gas, which consists mainly of methane in many applications, the latter is catalytically converted at least partially into CO and $H_2$ in the presence of $H_2O$ and with process heat being supplied. Instead of a gaseous fuel, a liquid one can be provided. Liquid fuel provides additional problems, in that liquid fuel must be fed into the reformer in a suitable manner.

SUMMARY OF THE INVENTION

The object of the invention is to provide a plant with high temperature fuel cells in which the water ($H_2O$) which is required for the total process is won and is supplied to the reforming in a manner which is advantageous for the entire process. Additional measures are also provided through which a soot formation in critical fuels, in particular in liquid fuels (which contain hydrocarbons $C_nH_{2n+2}$ with n>5) is prevented as far as possible. This further object can also be satisfied by means of exhaust gas which can be taken from the afterburner chamber and which is fed back in a sufficiently large amount.

The plant in accordance with the invention contains high temperature fuel cells that are arranged with planar design in a centrally symmetrical stack. A supply point is provided for a gaseous or liquid fuel. In a reformer following the supply point the fuel can be catalytically converted at least partially into CO and $H_2$ in the presence of $H_2O$ and with process heat being supplied. An afterburner chamber follows the output points of the fuel cells. A feedback connection exists between the supply point and the afterburner chamber via which exhaust gas can be fed back to the supply point. In case no gas is provided as a fuel, the supply point comprises a means for feeding in a liquid fuel, for example an atomizer.

$O_2$ is supplied to the fuel with the fed back exhaust gas. This results in a partial oxidation in the reformer, through which the products CO and $H_2$ are formed from hydrocarbons $C_nH_{2n+2}$. The liberated heat is absorbed in the reforming, which takes place in parallel, and is thus utilized. Through the partial oxidation, soot formation is advantageously inhibited.

The $CO_2$ that is additionally contained in the fed back exhaust gas likewise yields, as does $H_2$, a reforming of the hydrocarbons to CO and $H_2$.

A method for the operation of this plant is disclosed.

BRIEF DESCRIPTION OF THE DRAWINGS

The invention will be explained in the following with reference to the drawings in which:

FIG. 3 is a second embodiment of a plant with exhaust gas feedback;

FIG. 4 is a supply point for liquid fuel;

FIG. 5 is a section of a gas-permeable structure that can be used as a catalyst carrier of a reformer for liquid fuels; and, FIG. 6 is a table with numerical values for the enthalpies which are taken up or given off in the $H_2O$ and $CO_2$ reforming processes and the partial oxidation with the hydrocarbons $C_nH_{2n+2}$, n=1, 4, 16 or 20 respectively.

DESCRIPTION OF THE SPECIFIC EMBODIMENTS

Figure 1:
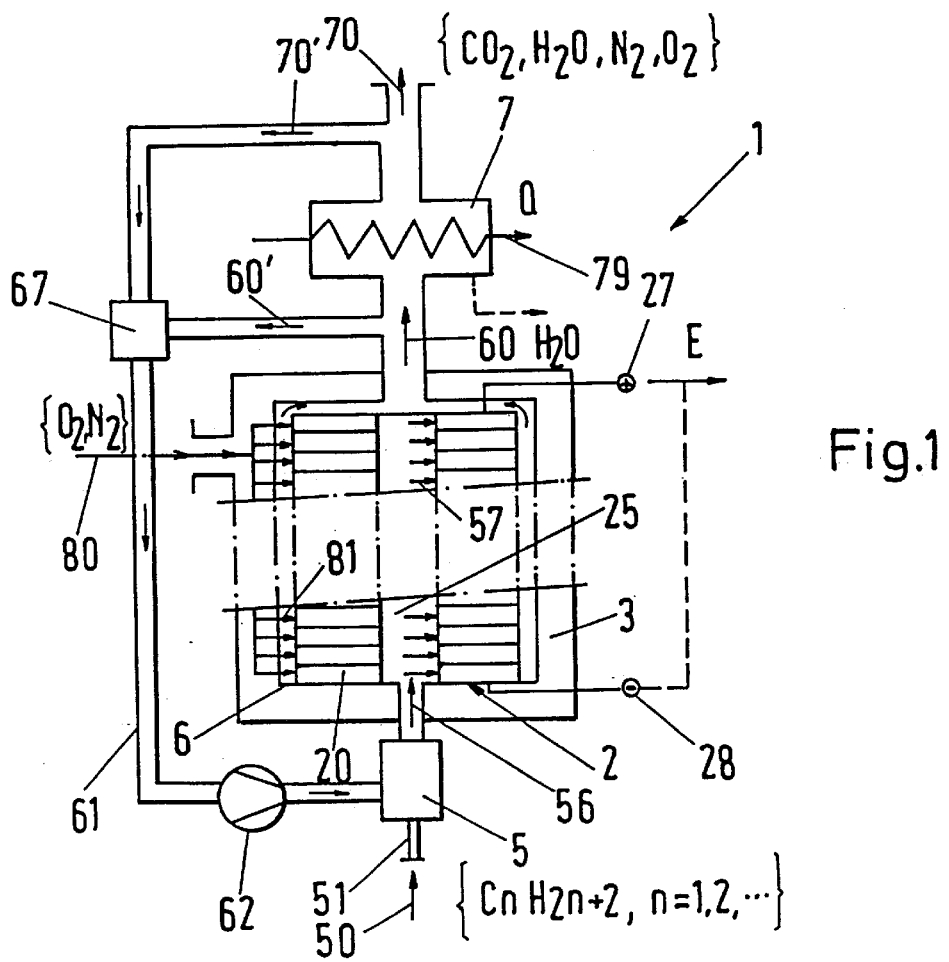
FIG. 1 is a plant in accordance with the invention with high temperature fuel cells, illustrated schematically.

The plant 1 of FIG. 1 includes a stack 2 with planar, ring-shaped fuel cells 20 and poles 27, 28 for the giving off of an electrical energy E. A sleeve 3 has a non-illustrated inner construction permitting environmental air 80, 81 to be preheated during the operation. Environmental air is supplied uniformly distributed to the cell stack 2. An afterburner chamber 6 is provided between the cell stack 2 and the sleeve 3. Exhaust gas 60, 70 is conducted off via a heat exchanger 7 (transfer of heating warmth Q to a heat carrier means 79 of a water circulation). A mixing member 67 in which hot exhaust gas 60' is brought together with cooled down exhaust gas 70' is provided. Finally, a feedback line 61 for the exhaust gas and a ventilator 62 to add air to the feedback line 61. There is provided a plant part 5 in which fuel 50 from supply line 51 is mixed with the fed back exhaust gas of line 61. The mixture is treated through reforming following this supply point 5 and the treated fuel 57 is fed into the cells 20, through which it flows as a gas 58.

The reforming is an endothermic process. A reformer 4—see FIG. 2—is advantageously arranged in a central cavity 25 of the cell stack 2 along the stack axis and is designed in such a manner that radiation heat which is given off by the cells 20 can be taken up by it.

Figure 2:
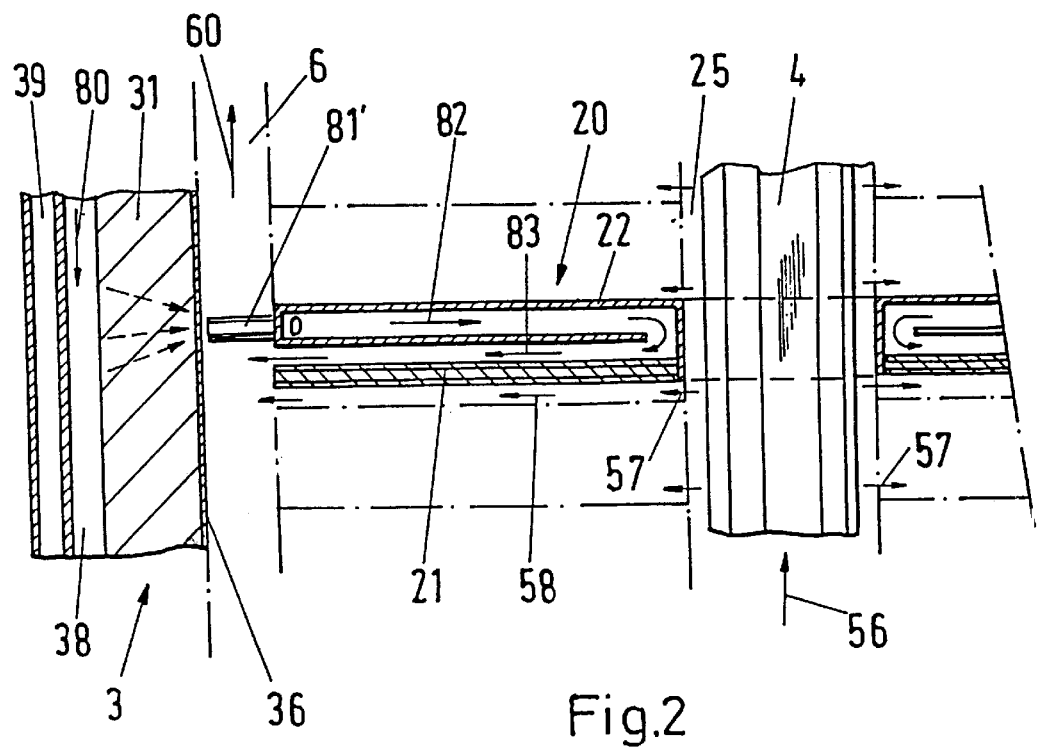
FIG. 2 is a section of the plant with a cross-sectioned fuel cell.

FIG. 2 shows further details. The high temperature fuel cell 20 comprises an electrochemically active plate 21 (with two electrode layers and a solid electrolyte layer lying between them) and an inter-connector 22 which connects the electrochemically active plates 21 of adjacent cells 20 in an electrically conducting manner. The inter-connector 22 is designed as a heat exchanger for the heating of air 82 that is fed in through supply lines 81'. The heated air 83 flows radially outwardly parallel to the gas 58. Constituents of the gas 58 that have not reacted in the cell 20 are burned after joining with the air-flow 83 in the afterburner chamber 6. The ring-gap-shaped chamber 6 is surrounded by an air-permeable wall 31 sealed off at the inner side with a layer 36. Air 80 is distributed via a second ring-gap-shaped space 38 onto the wall 31, heated in the latter and fed into the inter-connectors 22 through the lines 81'. The sleeve that surrounds the wall 31 and the distributor chamber 38 is closed off against the outside by an evacuated, ring-gap-shaped chamber 39.

During the operation of the plant 1, processes take place in the fuel cells 20 These fuel cells (20) deliver current and form exhaust gas and waste heat. Exhaust gas 60', 70' that is fed back into the reformer 4 contains $H_2O$, $CO_2$, $O_2$ and $N_2$. The reforming of the fuel 50 that contains hydrocarbons such as e.g. $C_nH_{2+2n}$ with n=1, 2, ..., is an endothermic reactions such as

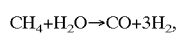

$$C_nH_{2n+2} + nH_2O + (2n+1)H_2,$$

$$CH_4 + CO_2 \rightarrow 2CO + 2H_2.$$

Parallel to these reactions, partial oxidations, that is, exothermic reactions such as:

$$C_nH_{2n+2} + n/2\,O \rightarrow nCO + (n+1)H_2,$$

take place. The heat which is liberated in the partial oxidations and the waste heat of the energy delivering processes of the fuel cells supply the process heat for the reforming.

Advantageously only a minimum amount of exhaust gas 60', 70' is fed back to the reforming processes, with the hydrocarbons not being completed converted. If the material of the gas electrodes in the fuel cells 20 is suitable for a reforming, the hydrocarbons need not be completely converted, in particular only to the extent of 10 to 90%.

FIG. 3 shows a plant 1 in which a portion of the exhaust gas 70' that is fed back is admixed to environmental air 80. The environmental air 80, which is forwarded by a blower 8, serves the current delivering processes as a medium which gives off $O_2$ and takes up waste heat. The amount forwarded yields an excess of $O_2$ (relative to the stoichiometric amount required for the processes). The amount of $O_2$ which is supplied is set in such a manner that an excess of $O_2$, related to the stoichiometric amount required, is at most up to 300%.

With the exhaust gas 70', which is admixed through a line 71 and a valve 72, the proportion of $O_2$ in the air 58 which flows through the cells 20 is reduced. A corresponding reduction of the $O_2$ content also results for the exhaust gas 60 that is formed. This is advantageous because less $O_2$ is fed into the reformer with the fed back exhaust gas 70' and thus the efficiency of the plant 1 is improved thanks to a reduction of the through-put due to the partial oxidation. Like in the first exemplary embodiment, hot exhaust gas 60' can also be admixed to the feedback exhaust gas 70' (not shown in FIG. 3).

The heat exchanger 7 can comprise an additional burner. In an additional burner of this kind which follows the afterburner chamber 6, which can be provided to cover an increased heat requirement, an additional combustion can be carried out with additional fuel and the exhaust gas 60, which contains $O_2$. It is also possible to use only a portion of the exhaust gas 60 for an additional combustion of this kind.

FIG. 4 shows a supply point 5 for a liquid fuel 50 which is fed in by a pump 52. The fuel 50 is sprayed in a nozzle device 54 and mixed with the exhaust gas 70' (or 70' and 60') which is fed back. The mixture which is produced, an aerosol spray 56', is distributed into the reformer 4 which is located in the central cavity 25 of the cell stack 2 (see FIGS. 1 and 2). In the tubular reformer 4 the aerosol spray 56' is treated (through reforming and/or partial oxidation) in a gas-permeable structure 40 which carries catalysts. This structure 40, which is illustrated as a section in FIG. 5, comprises an inner zone 40a and an outer zone 40b in a concentric arrangement. The outer zone 40b is formed uniformly and produces a substantially greater radial flow resistance than the inner one. The inner zone 40a is designed as a droplet precipitator. There the liquid phase of the fuel 50 passes into the gaseous form through evaporation or as a result of chemical reactions. In the outer zone 40b the treatment is continued; at the same time a uniform distribution of the treated gas 57' onto the individual fuel cells 20 takes place through the denser zone 40b.

For example the following materials come under consideration as catalysts for the reforming and/or the partial oxidation: platinum, palladium, ruthenium, rhodium and nickel or a mixture of two or more of these materials. Nickel is however less suitable for the partial oxidation due to soot formation.

In difficult to handle hydrocarbons (gasoline, heating oil, rape oil) an additional water inlet (reference symbol 90 in FIG. 3) can be required in order to be able to eliminate the danger of carbon depositing, i.e. soot formation. Through the additional water inlet practically any desired ratio of the reactions reforming and partial oxidation to one another can be set. Since this ratio is different depending on the fuel, the method can be ideally adapted to the respective fuel. In fuels which tend only slightly to soot formation (natural gas, bio-gas, methanol) an additional water supply can be dispensed with.

In FIG. 6 numerical values are shown for the enthalpies (the unit is kJ/mol) which are taken up or given off in the endothermic $H_2O$ and $CO_2$ reforming processes (positive enthalpy values). The partial oxidation (negative enthalpy values) with the hydrocarbons $C_2H_{2n+2}$, n=1, 4, 16 or 20 respectively are collected in tabular form.

The nitrogen in the fed back exhaust gas results in a dilution of the fuel gas. This has no serious negative influence on the electrochemical performance of the plant. The nitrogen component even has a positive effect, since it reduces the formation of soot.

The ventilator 62 (FIG. 3) that is provided for the feedback of the exhaust gas can be replaced by an injector provided a gaseous fuel is available which has a sufficiently great pressure. With a fuel of this kind, a drive flow can be produced in the injector. Then exhaust gas can be sucked in and can be fed into the reformer mixed with the fuel.

The exemplary embodiments described relate to plants in which the reformer is located in the interior of the cell block. The invention however also refers to plants in which the reformer is arranged outside the cell block but still within the sleeve (such as in the initially named EP-A 0 780 917) or completely outside the sleeve, for example in the plant part 5 of FIG. 1.

What is claimed is:

1. A plant with high temperature fuel cells (20) for producing electrical power from gaseous or liquid fuel (50) supplied to the plant, comprising:

a stack (2) of a plurality of high temperature fuel cells (20), each fuel cell (20) being planar, and disposed about a common axis;

a reformer (4) arranged for an endothermic conversion of the fuel at least partially into CO and $H_2$ in the presence of $H_2O$;

a supply point (5) for the fuel (50) to one end of the reformer (4) for introducing fuel for the endothermic conversion;

each high temperature fuel cell (20) including a path for the endothermically converted fuel to at least partially react exothermically with air to produce electrical power;

an afterburner chamber (6) for further burning of the fuel with the air flowing out of the high temperature fuel cells, the afterburner chamber (6) surrounding the stack of high temperature fuel cells (20);

a feedback line (61) from the afterburner chamber (6) to the supply point (5);

a heat exchanger (7) having heat carrier means (79) placed in the feedback line (61);

a first portion of the exhaust gas (60') directly from the afterburner chamber before the heat exchanger is fed to the feedback line (61);

a second portion of the exhaust gas directly from the afterburner chamber fed to the heat exchanger to recover heat from said second portion of the exhaust gas directly from the afterburner chamber to give a cooled down exhaust gas, and a first portion of the cooled down exhaust gas (70) discharged after the heat exchanger.

2. The plant according to claim 1 and further including:

a ventilator (62) arranged in the feedback line (61) to add air to the fuel (50).

3. The plant according to claim 2 and further including:

a mixing member (67) arranged in between the heat exchanger and ventilator (62);

an input from said first portion of the exhaust gas (60') directly from the afterburner chamber to the mixing member (67) to enable the mixing member (67) to mix said first portion of the exhaust gas (60') directly from the afterburner chamber with a second portion of the cooled down exhaust gas (70') from the heat exchanger.

4. The plant according to claim 1 and further wherein:

the heat exchanger (7) having heat carrier means (79) placed in the feedback line (61) comprises an additional afterburner.

5. The plant according to claim 1 and further including:

said stack (2) of high temperature fuel cells (20) defining a central cavity in the stack (2) with said high temperature fuel cells being adjacent to one another;

the reformer (4) arranged in the central cavity of the stack for an endothermic conversion of the fuel at least partially into CO and $H_2$ in the presence of $H_2O$ whereby the heat required for the endothermic conversion of fuel is at least partially radiated to the reformer (4) from the fuel cells (20).

6. A method of operating a plant with high temperature fuel cells (20) for producing electrical power from gaseous or liquid fuel (50) supplied to the fuel cells, the method comprising the steps of:

providing a stack (2) of a plurality of high temperature fuel cells (20), each fuel cell (20) being planar, and disposed about a common axis;

providing a reformer (4) arranged for an endothermic conversion of the fuel at least partially into CO and $H_2$ in the presence of $H_2O$;

providing a supply point (5) for the fuel (50) to one end of the reformer;

introducing fuel for the endothermic conversion to the one end of the reformer;

providing each high temperature fuel cell (20) with a path for the endothermically converted fuel to at least partially react exothermically with air to produce electrical power and to supply heat to the reformer (4);

providing an afterburner chamber (6) for further burning of the fuel with the air flowing out of the high temperature fuel cells, the afterburner chamber (6) surrounding the stack of high temperature fuel cells (20);

further burning the fuel with the air flowing out of the high temperature fuel cells in the afterburner chamber (6);

providing a feedback line (61) from the afterburner chamber (6) to the supply point (5) to feed back exhaust gas from the afterburner chamber to the supply point;

feeding back exhaust gas from the afterburner chamber to the supply point through the feedback line;

supplying the fuel cells with environmental air via a blower such that an excess amount of oxygen provided to the exothermic process to deliver current is less than three times the stoichiometric amount of oxygen needed for the exothermic process; and admixing a portion of the exhaust gas from the afterburner chamber with the environmental air.

7. The method of operating a plant with high temperature fuel cells (20) according to claim 6 wherein:

the step of feeding back exhaust gas to the supply point includes feeding back exhaust gas with hydrocarbons that are 10 to 90% converted.

8. The method of operating a plant with high temperature fuel cells (20) according to claim 6 further including:

providing a heat exchanger (7) having heat carrier means (79) placed in the feedback line (61) to recover heat from a portion of exhaust gas from the afterburner chamber to the heat carrier means (79) and to discharge a portion of the cooled down exhaust gas (70) after the heat exchanger.

9. The method of operating a plant with high temperature fuel cells (20) according to claim 6 further including:

introducing additional water to the reformer (4).

* * * * *